US008368325B2

(12) United States Patent  (10) Patent No.: US 8,368,325 B2
Kim et al.  (45) Date of Patent: Feb. 5, 2013

(54) LIGHTING SYSTEM

(75) Inventors: Taegi Kim, Seoul (KR); Changho Kim, Seoul (KR); Kwanghyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/425,962

(22) Filed: Mar. 21, 2012

(65) Prior Publication Data

US 2012/0268041 A1 Oct. 25, 2012

(30) Foreign Application Priority Data

Mar. 21, 2011 (KR) .......................... 10-2011-0024911

(51) Int. Cl.
H05B 39/00 (2006.01)

(52) U.S. Cl. .................... 315/312; 315/200 R; 315/361; 315/307

(58) Field of Classification Search .............. 315/200 R, 315/312, 185 R, 192, 201, 205, 291, 297, 315/299, 307, 361; 340/286.01
See application file for complete search history.

(56) References Cited

U.S. PATENT DOCUMENTS

| 2010/0076612 | A1* | 3/2010 | Robertson | 700/286 |
| 2011/0133655 | A1* | 6/2011 | Recker et al. | 315/159 |

FOREIGN PATENT DOCUMENTS

| JP | 10-275685 A | 10/1998 |
| JP | 11-067463 A | 3/1999 |
| JP | 2002-299072 A | 10/2002 |
| JP | 2003-133082 A | 5/2003 |
| JP | 2008-108634 A | 5/2008 |
| KR | 10-2002-0012456 A | 2/2002 |
| KR | 10-2003-0065885 A | 8/2003 |
| KR | 10-0454905 | 11/2004 |
| KR | 20-0394747 | 9/2005 |
| KR | 10-0724585 | 6/2007 |
| KR | 10-2008-0099527 A | 11/2008 |
| KR | 10-0944943 B1 | 3/2010 |
| KR | 10-0972496 | 7/2010 |

OTHER PUBLICATIONS

Korean Office Action dated Apr. 15, 2011 issued in Application No. 10-2011-0024911.
Korean Office Action dated Jul. 1, 2011 issued in Application No. 10-2011-0024911.
Korean Office Action dated Sep. 1, 2011 issued in Application No. 10-2011-0024911.
Korean Notice of Allowance dated Jan. 2, 2012 issued in Application No. 10-2011-0024911.

* cited by examiner

*Primary Examiner* — Douglas W Owens
*Assistant Examiner* — Jianzi Chen
(74) *Attorney, Agent, or Firm* — KED & Associates, LLP

(57) ABSTRACT

A lighting system includes a plurality of lights connected to a bridge, a gateway, a lighting controller, and an interface. A plurality of commands to control a corresponding light may be stored in a memory. A communication module may be provided to generate a packet for transmission to the gateway based on the plurality of stored commands. The packet may combine a plurality of the commands for controlling one or more of the lights.

15 Claims, 11 Drawing Sheets

FIG. 8A

| 1 | 2 | 3 | 4 | 5 | 6 | 7 | 8 | 9 | 10 | 11 | ← C1 |
|---|---|---|---|---|---|---|---|---|----|----|------|
| 100 |  | 80 |  | 80 | 100 | 100 |  | 100 |  |  | ← C2 |

FIG. 8B

| Control Value (1Byte) | Event Count (1Byte) | Device Addresses (2Bytes * Event Count) |
|---|---|---|
| 100 | 4 | 1,6,7,9 |

FIG. 8C

| Control Value (1Byte) | Event Count (1Byte) | Device Addresses (2Bytes * Event Count) |
|---|---|---|
| 80 | 2 | 3,5 |

LIGHTING SYSTEM

CROSS-REFERENCE TO RELATED APPLICATION(S)

This application claims priority under 35 U.S.C. §119 to Korean Application No. 10-2011-0024911 filed in Korea on Mar. 21, 2011, whose entire disclosure is hereby incorporated by reference.

BACKGROUND

1. Field

A lighting system and methods for controlling the same are disclosed herein. The lighting system and methods as disclosed improve the operation of lighting to allow a more efficient utilization and conservation of energy resources.

2. Background

Lighting systems and methods for controlling the same are known. However, they suffer from various disadvantages.

BRIEF DESCRIPTION OF THE DRAWINGS

The embodiments will be described in detail with reference to the following drawings in which like reference numerals refer to like elements wherein:

FIGS. 7A to 7B and 8A to 8C are conceptual diagrams of a packet to illustrate an operation of the controller according to an embodiment of the present disclosure;

DETAILED DESCRIPTION

Figure 1:
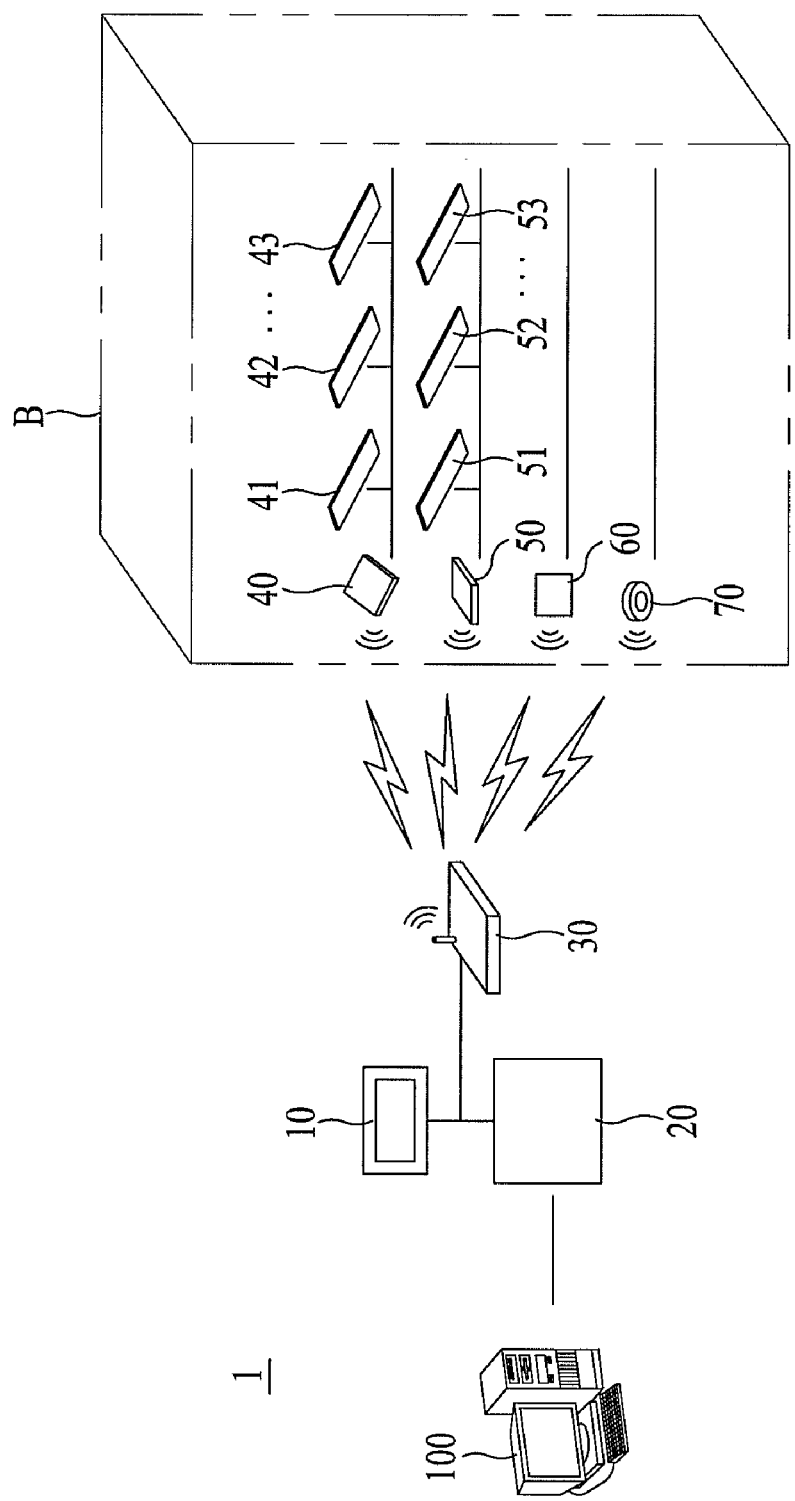
FIG. 1 is a schematic diagram of a lighting system according to an embodiment of the present disclosure.

In general, incandescent lamps, discharge lamps, and fluorescent lamps are used most commonly as light sources for various purposes, such as domestic, landscape, industrial, or other appropriate types of lighting applications. These types of light sources suffer from various disadvantages such as poor efficiency and large amounts of heat generation (e.g., incandescent lamps), high price and high operational voltage (e.g., discharge lamps), and may be harmful to the environment due to their use of mercury (e.g., fluorescent lamps).

Light emitting diode (LED) based light sources may overcome the drawbacks of these light sources. LEDs have advantages in efficiency, flexibility to emit light in a variety of colors, autonomy of design, and so on. The LED is a semiconductor device which emits light when a forward voltage is applied thereto. LEDs have a greater lifespan, lower power consumption, and electric, optical, and physical characteristics which are suitable for mass production when compared to incandescent, discharge, or fluorescent types of light sources.

A controller may be provided to control the light sources. For example, a large building may be equipped with a lighting system that includes a large number of LED based light sources. The controller may be a central controller configured to manage and control the lighting system. The controller may control the operation of the LEDs, for example, to turn on/off the LEDs, and manage the operational states, for example, to manage power consumption or collect state information of the light sources. The controller may manage and control the lighting based on a particular zone or group of light sources (e.g., a floor or room). The controller may detect areas in which unnecessary energy is being consumed to minimize waste. The controller may manage maintenance of equipment (e.g., maintenance schedules, fault detection, etc.) as well as maintenance of an inside environment of the building (e.g., operation based on schedules, occupancy, etc.) to control energy consumption.

One or more interfaces may be provided on each floor or zone in the building and connected in communication with the central controller. The interface may be configured to receive control inputs as well as to display operational states of the lighting apparatuses. The interface may include a GUI to control and manage the lighting system.

When attempting to control a large number of LEDs, either individually or as a group (e.g., room, floor, or building), network load may increase due to traffic from a large number of control data and event information, and a large amount of load may be placed on processors as well as the network.

The lighting system as disclosed herein may reduce the quantity of traffic introduced into a network and may improve the reliability of communication. The lighting system may combine a plurality of packets that include control commands or other information associated with light emitting apparatuses (e.g., responses, events, or status information) into a single packet. Moreover, as disclosed herein a packet that combines information for a plurality of light emitting apparatuses may be generated in response to changes in the information, in order to reduce traffic and processor load.

Figure 2:
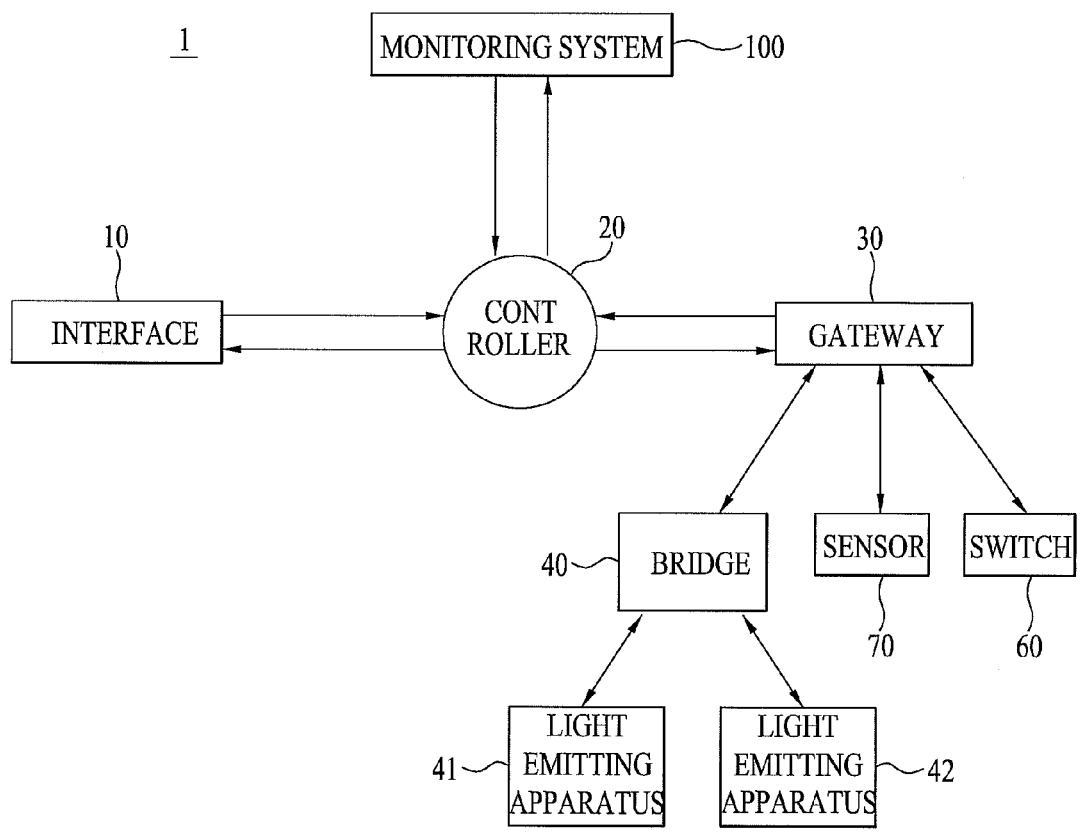
FIG. 2 is a block diagram of the lighting system of FIG. 1.
Figure 3:
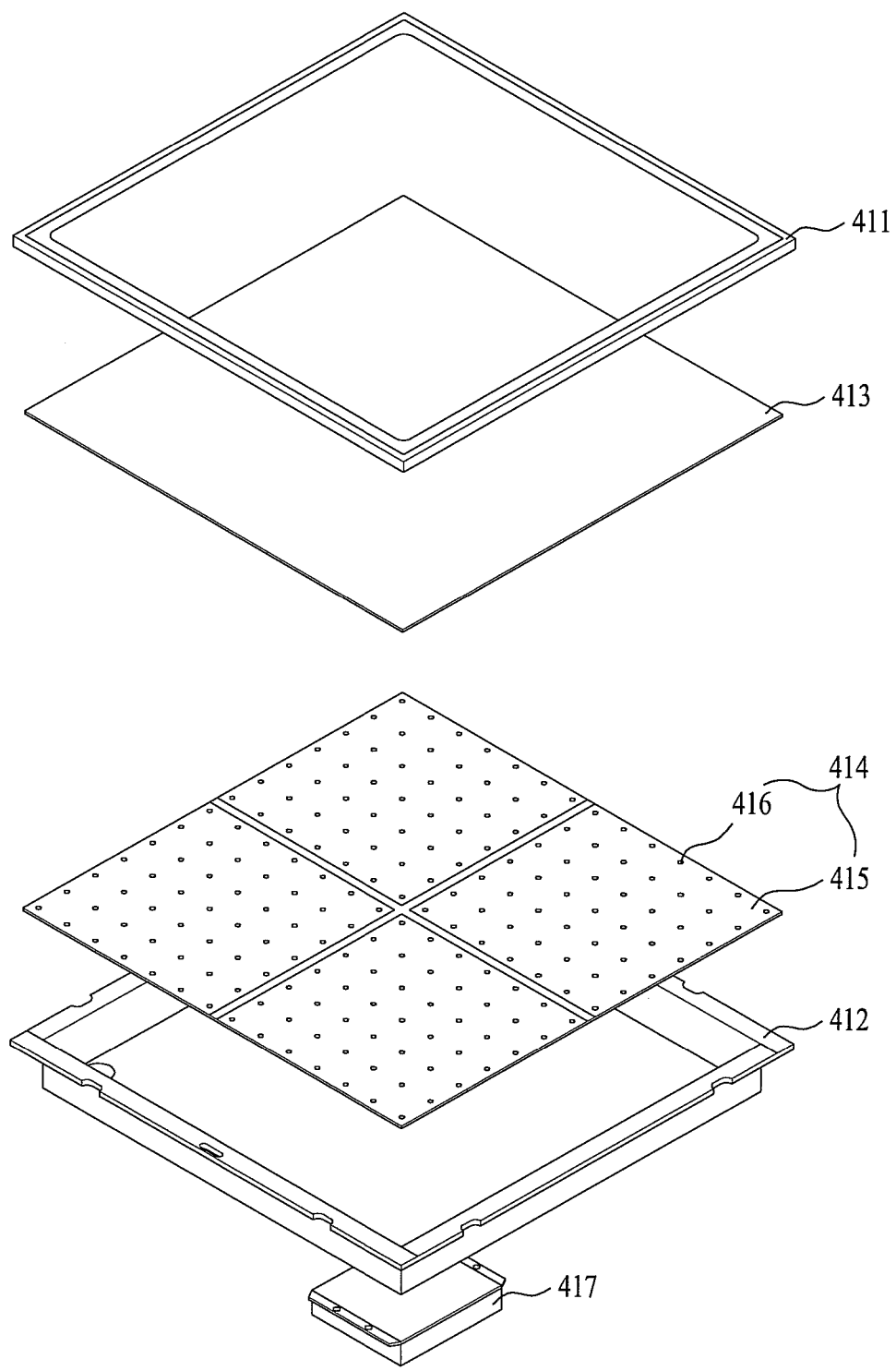
FIG. 3 is an exploded perspective view of a light emitting apparatus of the lighting system according to an embodiment of the present disclosure.

FIG. 1 illustrates a schematic view of a lighting system 1 in accordance with a preferred an embodiment of the present disclosure. FIG. 2 illustrates a block diagram of the lighting system in accordance with an embodiment of the present disclosure. FIG. 3 illustrates an exploded perspective view of a light emitting apparatus of a lighting system in accordance with an embodiment of the present disclosure.

The lighting system 1 may include an interface 10, a lighting controller 20, a terminal 100, a gateway 30, bridge devices 40, 50, a plurality of light emitting apparatus 41 to 43, 51 to 53 connected to the bridge devices 40, 50 to enable communication therebetween, a switch 60, and a sensor 70. It should be appreciated that the lighting system 1 may include various combinations of the elements which are shown in FIG. 1.

A building B may have installed therein the plurality of light emitting apparatuses 41 to 43, 51 to 53, the switch 60 to turn the light emitting apparatuses on/off, and the sensor 70 to sense light intensity, or the like, in a lighting space. The light emitting apparatuses 41 to 43, 51 to 53 may be one of a plurality of types of light sources including, for example, an LED type light source. The light emitting apparatus 41 to 43 and 51 to 53 provided in the building B may be a flat type or a bulb type light source.

Referring to FIG. 3, the light emitting apparatus 41 may include a front case 411, a rear case 412, a light emitting module 414 disposed in a space between the front case 411 and the rear case 412, a diffusing member 413 disposed between the light emitting module 414 and the front case 411, and a converter 417 electrically connected to the light emitting module 414. The light emitting module 414 may include a substrate 415 and a plurality of LEDs 416 mounted to the substrate. The light emitting apparatus 41 may be a flush mount type lighting device in which the converter 417 and a region of the rear case 412 are mounted inside a wall or another appropriate type of surface. The LEDs 416 may have a color rendition which is higher than Ra 75, and an efficiency which is higher than 65 Im/W.

Referring again to FIGS. 1 and 2, the lighting controller 20 may be provided to control the operation of the light emitting apparatuses 41 to 43, 51 to 53 based on received inputs. The lighting controller 20 may be connected to the terminal 100, the interface 10, and the gateway 30. The lighting controller 20 may receive various control inputs for controlling the light emitting apparatuses 41 to 43, 51 to 53 from the terminal 100 or interface 10 and transmit appropriate control signals to the gateway 30 to control the lighting. The lighting controller 20 may receive monitoring information from the sensor 70. The lighting controller 20 may directly control the light emitting apparatuses based on the received monitoring information and/or forward the monitoring information to the terminal 100 and interface 10.

Moreover, the lighting controller 20 may store addresses of each light emitting apparatus as well as the switch 60 and sensor 70. The lighting controller 20 may also store user preference information, scheduling information, zone or control group information, or another appropriate type of information to control and manage the lighting system 1.

The gateway 30 may communicate with the lighting controller 20 to receive control signals from the lighting controller 20 for group/individual lighting control or entire floor or building control. The gateway 30 may forward the control signals to an appropriate device to control the same. The gateway 30 may communicate with the lighting controller 20, the bridge devices 40, 50, the switch 60, or sensor 70 over a wireless or wired connection. In one embodiment, the gateway 30 may be a Zigbee gateway.

The bridge devices 40, 50 may be connected to the gateway 30 and the plurality of the light emitting apparatuses 41 to 43, 51 to 53 to enable communication therewith for transmitting the control signals from the gateway 30 to the light emitting apparatuses 41 to 43 and 51 to 53. The bridge devices 40, 50 may also transmit a response or event/state information from the light emitting apparatuses 41 to 43, 51 to 53 to the gateway 30.

The first bridge device 40 may be connected to a first group of light emitting apparatuses 41 to 43 and the second bridge device 50 may be connected to a second group of light emitting apparatuses 51 to 53 to enable communication therewith. The bridge devices 40, 50 may be connected up to a prescribed maximum number of light emitting apparatuses. In one embodiment, the bridge device 40, 50 may be connected up to 12 light emitting apparatuses.

As an example, the bridge devices 40, 50 may be connected to the gateway 30 using the Zigbee specification. The bridge devices 40, 50 may be connected to the light emitting apparatuses 41 to 43, 51 to 53 using the RS-485 protocol which is a serial communication protocol.

An input received, for example, at the interface 10 is may be transmitted to the lighting controller 20, the gateway 30, and the bridge device 40, 50 in succession. The bridge device 40 may transmit the received commands to the appropriate light emitting apparatus through the serially connected light emitting apparatuses 41 to 43. Likewise, bridge device 50 may forward the commands to an appropriate light emitting apparatuses serially connected thereto. For example, a command to turn off light emitting apparatus 42 may be serially transmitted through light emitting apparatus 41.

A response or state/event information related to the light emitting apparatuses 41 to 43, 51 to 53 may be transmitted to a corresponding bridge device, the gateway 30, the lighting controller 20, and the interface 10, in succession. For example, a response or state/event information from light emitting apparatus 42 may be transmitted to light emitting apparatus 41 and then to bridge 40 over the RS-485 protocol. The response or state/event information may then be forwarded to gateway 30 using Zigbee.

The terminal 100 may be connected to the lighting controller 20 to control the light emitting apparatuses 41 to 43, 51 to 53. The terminal 100 may manage state information and power consumption in real-time, including turning the light emitting apparatuses on/off or changing the light intensity of the light emitting apparatuses mounted in a particular zone. The terminal 100 may also detect areas which may be using unnecessary energy to minimize waste, manage equipment in the building, manage maintenance of equipment operation, manage maintenance of an inside environment of the building, manage energy and materials consumed in through the above management operations, or the like.

The terminal 100 and the lighting controller 20 may be installed separately or the lighting controller 20 may be integrated into the terminal 100. For example, the terminal 100 may be installed in a main equipment room or at a remote location outside the building B and the lighting controller 20 may be mounted on each floor of the building B. Alternatively, the terminal 100 and the lighting controller 20 may be integrated and installed as a single apparatus.

The terminal 100 may be a desktop computer, laptop, display panel, PDA, tablet, or another appropriate type of device capable of performing the management functions. The terminal 100 may be connected over a distributed network through an appropriate type of network protocol (e.g., TCP/IP). The terminal 100 may be connected via wired or wireless connections.

In certain embodiments, a plurality of terminals 100 may be provided such that each terminal 100 may perform the management functions to control the lighting system 1. In this case, the plurality of terminals 100 may communicate with each other to synchronize information related to the management of the lighting system 1 such as operating schedules, or the like.

The interface 10 may be a display panel for inputting control inputs or displaying state information of the lighting system. The interface 10 may have a form factor which is smaller in size when compared to the terminal 100 which may allow the interface 10 to be easily installed throughout the building B. For example, the interface 10 may have a size and shape suitable to be wall mounted or used as a mobile device. An interface 10 may be provided on each floor or zone in the building B to receive control inputs and to display a GUI for controlling and monitoring the light emitting apparatuses 41-43, 51-53 in the lighting system 1.

The display of the interface 10 may be a touch screen display. The interface 10 may communicate with the lighting controller 20, may transmit inputs received through the GUI to the lighting controller 20 to control various groups/zones of lighting apparatuses. For example, the interface 10 may transmit control information to the lighting controller 20 to control a group/individual lighting apparatuses or an entire story or building. The interface 10 may also receive status information, or the like, from the lighting controller 20. The interface 10 may display the received information on the GUI.

It should be appreciated that while the interface 10 is described hereinabove as a display panel, the present disclosure is not limited thereto. The interface 10 may also be a desktop terminal (e.g., a desktop computer), laptop, PDA, tablet, or another appropriate type of computing device. Moreover, while the terminal 100 and the interface 10 have been disclosed as being connected through the lighting controller 20, it should be appreciated that the terminal 100 and interface 10 may be connected such that signals do not necessarily traverse through the lighting controller 20. For example, the terminal 100 and the interface 10 may be directly connected to each other or connected in a distributed network configuration with the lighting controller 20.

The control commands entered at the interface 10 may be transmitted to the respective light emitting units 41 to 43 and 51 to 53. First, control commands input via the interface 10 may be sequentially transmitted through the controller 20, the gateway 30, and the bridge device (for example, 40) which is connected to the corresponding light emitting unit (for example, 41) so as to communicate therewith. Moreover, response or event/state information from the respective light emitting apparatuses 41 to 43 and 51 to 53 may be sequentially transmitted through the bridge device (for example, 40) connected to the corresponding light emitting unit (for example, 41), the gateway 30, the controller 20, and the interface 10.

Figure 4:
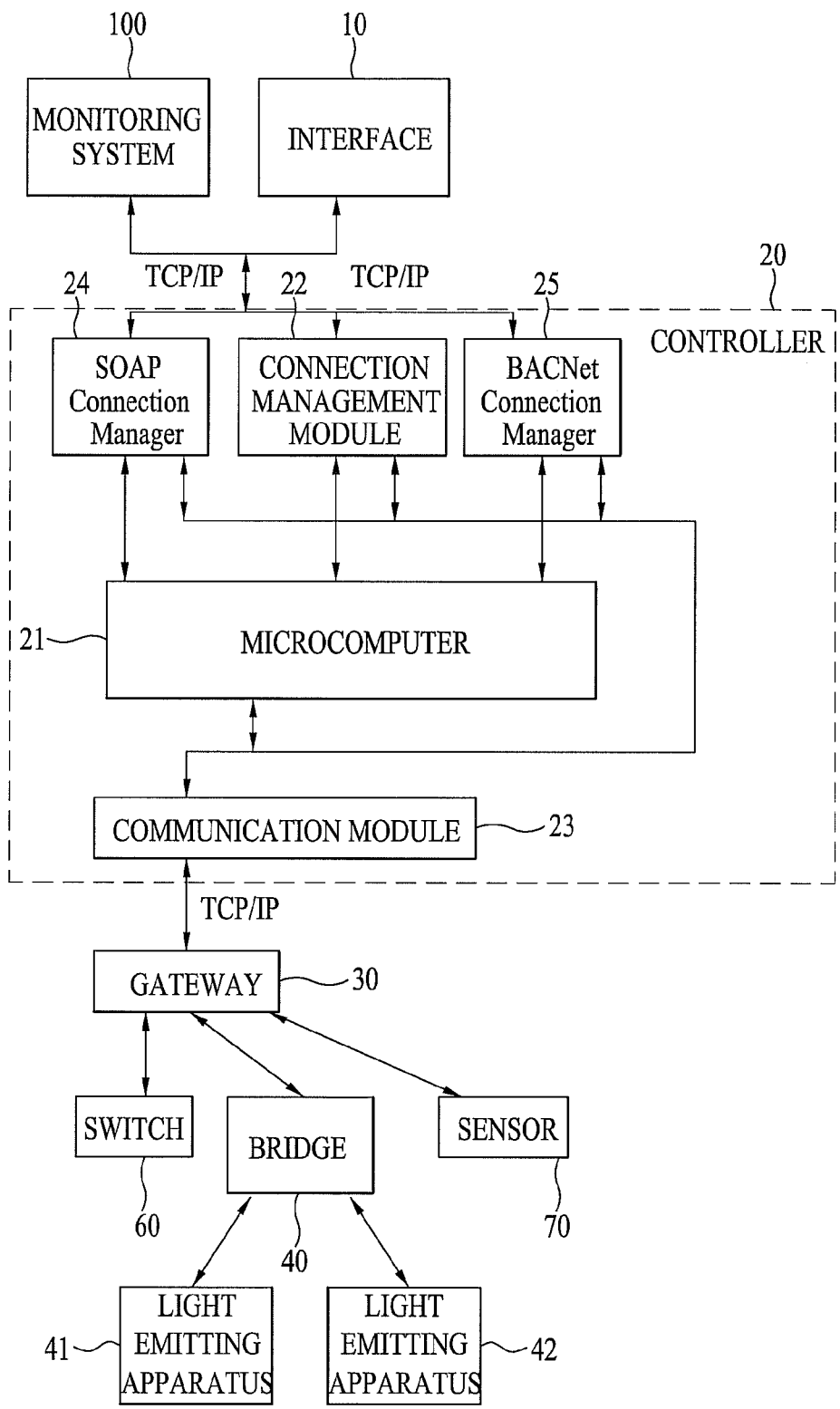
FIG. 4 is a block diagram of a controller according to an embodiment of the present disclosure.

FIG. 4 is a block diagram of the central lighting controller 20 of FIGS. 1 and 2. The controller 20 may include a microprocessor 21, a connection management module 22, a communication module 23, a SOAP connection manager 24, and a BACnet connection manager 25.

The microprocessor 21 may be configured for processing data for controlling the lighting L. The microprocessor 21 may receive commands from the terminal 10 or interface 11 through the SOAP connection manager 24 and/or the BACnet connection manager 25. The microprocessor 21 may process the received commands to generate a control data packet and transmit the generated control data packet to the lighting L through the communication module 23. Moreover, the microprocessor 21 may generate a response or event information related to the received commands and transmits the information to the terminal 10 or interface 11 through the connection management module 22.

The microprocessor 21 may perform group based control, individual based control, pattern control, schedule based control, power failure and power recovery control, illumination sensor interoperable control, or the like, for controlling and monitoring the lighting apparatus 41 to 43, 51 to 53, the switch 60, and/or the sensor 70.

The communication module 23 may control communication between the controller 20 and the gateway 30. The communication module 23 may format or convert data received 41 to 43 from the microprocessor 21 into a format compatible with the lighting apparatus 41 to 43, 51 to 53, the switch 60, or the sensor 70. The communication module 23 may transmit the formatted data to the gateway 30. The communication module 23 and the gateway 30 may transmit and receive, for example, TCP/IP packets. In addition, the communication module 23 may transmit to the microprocessor 21 a response or event information received from the gateway 30.

Upon receiving the control command from the terminal 10 or interface 11, a corresponding one of the connection management module 22, the SOAP connection manager 24, or the BACnet connection manager 25 may convert the received control command into an internal language capable of being recognized by the controller 20. The formatted control command may then be transmitted to the microprocessor 21. That is, one of the connection management module 22, the SOAP connection manager 24, or the BACnet connection manager 25 may interpret or convert the data from a protocol corresponding to either the terminal 10 or the interface 11 to the required format.

Figure 5:
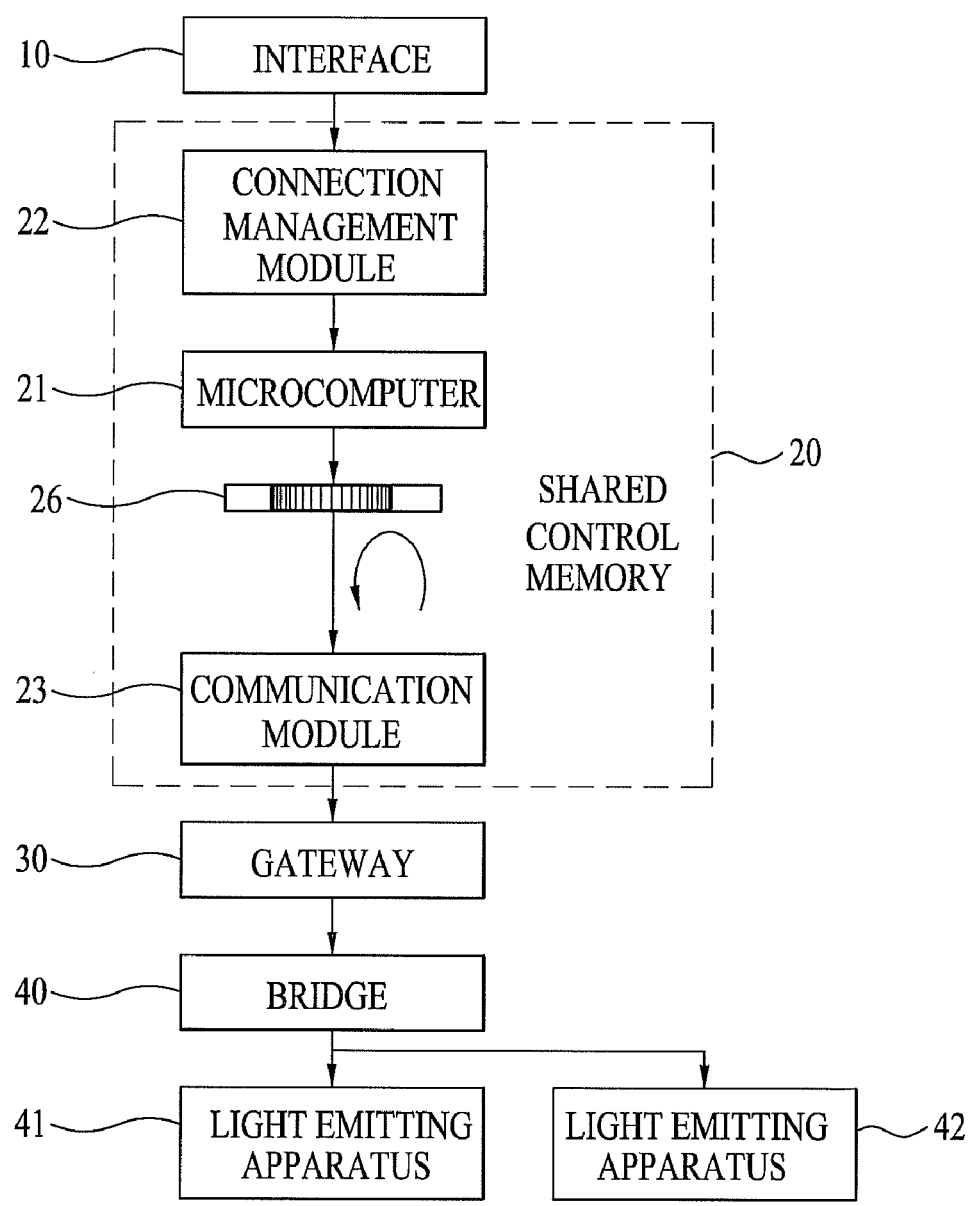
FIG. 5 is a block diagram illustrating an operation of the lighting system according to one embodiment of the present disclosure.
Figure 6:
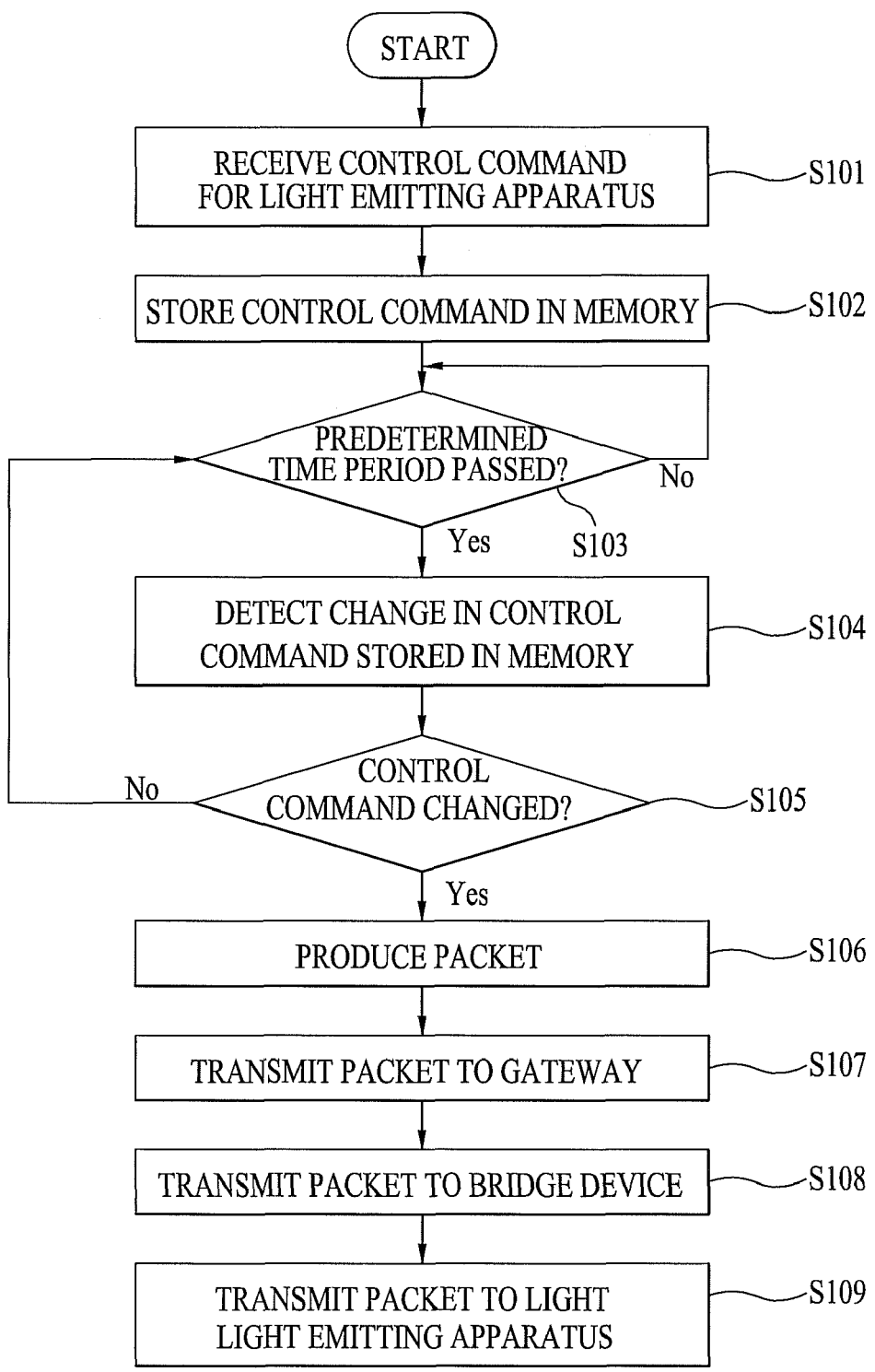
FIG. 6 is a flow chart illustrating the operation of the lighting system of FIG. 5.

FIG. 5 is a block diagram illustrating an operation of a lighting system according to one embodiment of the present disclosure. FIG. 6 is a flow chart illustrating the operation of the lighting system of FIG. 5. The lighting system may reduce the quantity of traffic introduced into a network and enhance reliability of communication by transmitting a single packet that includes a plurality of control commands associated with a plurality of light emitting apparatuses.

The lighting system may include the plurality of light emitting apparatuses 41 to 43 and 51 to 53, a plurality of bridge devices 40 and 50 to communicate with the plurality of light emitting apparatuses 41 to 43 and 51 to 53, a gateway 30 communicating connected to the bridges 40 and 50, and an interface 10 or terminal 100 to input control commands for the light emitting apparatuses 41 to 43 and 51 to 53 or to display status information of the light emitting apparatuses 41 to 43 and 51 to 53.

The controller 20 may include a communication module 23, a memory, 26, a microcomputer 21, and a connection management module 22. The controller 20 may also include a SOAP connection manager 24 and a BACnet connection manager 25 connected, as shown in FIG. 4.

The memory 26 (a shared control memory) may be configured to store a plurality of control commands transmitted from the interface 10. The communication module 23 may generate a single packet that includes control commands for the light emitting apparatuses 41, 42 and/or 43 connected to bridge 40 and the light emitting apparatuses 51, 52 and/or 53 connected to the other bridge 50. The consolidated packet may be transmitted to the gateway 30.

The connection management module 22 may be connected to the interface 10 and may be configured to convert the control commands transmitted from the interface 10 into controller internal language. The microcomputer 21 may store the converted control commands in the memory 26.

The communication module 23 may confirm the control commands stored in the memory 26 at predetermined time intervals (for example, every ~10 ms). For example, the communication module 23 may periodically access the memory 26 to determine whether the stored control commands have changed. The communication module 23 may generate a new packet that includes a plurality of control commands if the control commands stored in the memory 26 have changed. Moreover, the communication module 23 may generate the packet to include only the same control commands among the plurality of control commands for the light emitting apparatuses 41 and 42 stored in the memory 26. For example, the communication module 23 may combine control commands of the same type or control commands directed to a particular light emitting apparatus into a single packet.

The predetermined time interval may be set by the user and stored in the preferences or may be set automatically based on load. For example, when a large amount of data packets are loading the system, the time interval between packet generations may be increased to combine a greater amount of packets into a single packet. Conversely, a shorter time interval may reduce a delay in processing the packets to improve response times during times of low traffic. Moreover, the predetermined time interval may be a scheduled time, rather than a periodic time period.

Referring to FIG. 6, a control command may input at the interface 10 to control the light emitting apparatuses, in step S101. The control commands may be stored in the memory 26, in step S102. The controller 20 may determine whether a predetermined amount of time has elapsed, in step S103, and determine whether the control commands stored in the memory 26 have changed, in step S104. The communication module 23 may generate a packet including the stored control commands, in step S106 if it determines that the control commands have changed the communication module 23 may transmit the packet to the gateway 30, in step S107. Moreover, the control commands may be transmitted from the gateway 30 to the corresponding bridge device, in step S108, the bridge receiving the consolidated packet of multiple control commands may forward the packet to the respective light emitting apparatuses connected to the bridge, in step S109.

For example, step S101 may be performed by the connection management module 22 to receive the control commands input at the interface 10 and transmit the received control commands to the microcomputer 21. Step S102 may be performed by the microcomputer 21 and steps S104 to S107 may be performed by the communication module 23. It should be appreciated, however, that this disclosure is not limited thereto, and various processes can be implemented in another device.

FIGS. 7 and 8 are conceptual diagrams of a packet to illustrate an operation of the controller according to an embodiment of the present disclosure. The controller 20 may generate a packet that includes a plurality of control commands for controlling the light emitting apparatuses 41, 42 and/or 43 connected to any one bridge device (e.g., bridge 40) and the light emitting apparatuses 51, 52 and/or 53 connected to the other bridge device (e.g., bridge 50). The multi-command packet may be transmitted to the gateway 30, which may reduce network traffic by reducing the total number of packets.

Figure 7A:
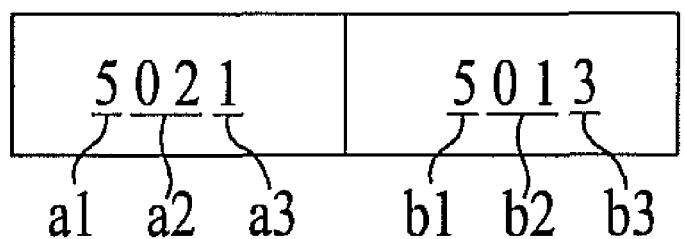
Figure 7B:
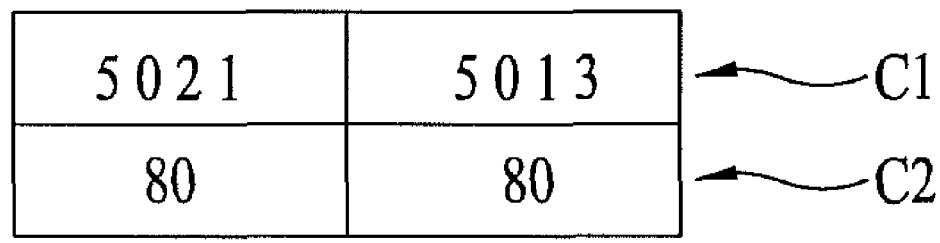

Referring to FIGS. 7A and 7B, the packet may include address information a2 and b2 of the bridge devices, address information a3 and b3 of the corresponding light emitting apparatus connected to the bridge devices, and control command values C2 for controlling the corresponding light emitting apparatus. Address information a1 having a value of "5" may represent a unique identification number that indicates that the packet is to be routed to the bridges, a value "02" for address information a2 may represent a second bridge (e.g., bridge 50), and a value "1" for address information a3 may correspond to a first light emitting apparatus (e.g., light emitting apparatus 51) connected to the second bridge 50. That is, a value C1 of "5021" may represent an address of a first light emitting apparatus connected to a second bridge device. Moreover, a packet that includes address information C1 of "5021" may be associated with a control command value, as shown in FIG. 7B. A value C2 of "80" may represent a particular control command value. Likewise, the address information C2 of "5013" may represent a third light emitting apparatus connected to a first bridge which corresponds to a control command value of "80."

The communication module 23 may monitor the control command values stored in the memory 26 at predetermined time intervals. If the control command value corresponding to a light emitting apparatus is found to have changed, the communications module 23 may generate the single packet including the plurality of control command values. Specifically, instead of separately transmitting each of the control command values stored in the memory 26 at a predetermined time interval or in real time, the communication module 23 may periodically generate a packet to combine the plurality of control command values. Moreover, this packet may be generated only when the control command values stored in the memory 26 have changed.

Referring to FIG. 8A, the communication module 23 may generate a single packet that includes control commands for the light emitting apparatuses which have the same command value among the plurality of control command values for the light emitting apparatuses stored in the memory 26. For example, the memory 26 may have a plurality of storage sections divided based on the address information C1 of first to eleventh light emitting apparatuses with corresponding control command values C2 for the respective light emitting apparatuses.

The communication module 23 may generate a single packet that includes control commands for the light emitting apparatuses which have the same command value among the plurality of control command values for the light emitting units stored in the memory 26, as illustrated by FIG. 8B. For example, control commands for the first, sixth, seventh, and ninth light emitting apparatuses which have the same control command value of 100 may be combined in a single packet, as shown in FIG. 8B, and control commands for the third and fifth light emitting apparatuses which have the same control command value of 80 may be combined in a single packet, as shown in FIG. 8C. Thus, the communication module 23 may generate six control commands into two packets and transmit the two packets to the gateway 30. The first packet may have four sections and the second packet may have two sections in a format as shown in FIG. 7B. Because only two packets are sent to the gateway 30 instead of six packets, the consolidated packets may reduce network traffic.

The memory 26 may further include storage sections to store sequence numbers that may be used to confirm a change in the control commands. The microcomputer 21 may input the control command values and the sequence numbers together into the memory 26. The communication module 23 may compare previous values to current values of the sequence numbers to determine that the control commands stored in the memory 26 have changed if the previous values differ from the current values.

Figure 9:
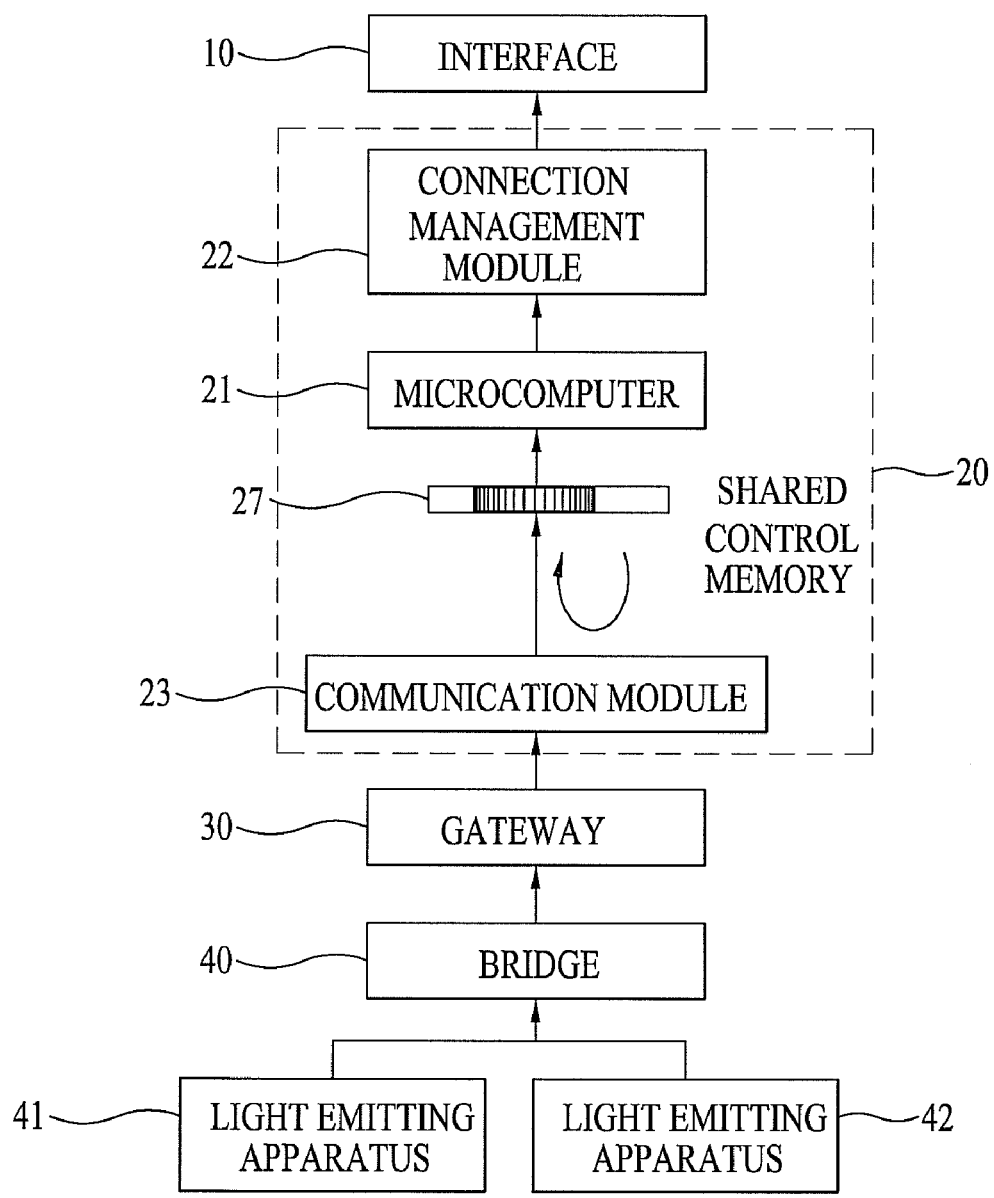
FIG. 9 is a block diagram illustrating an operation of the lighting system according to one embodiment of the present disclosure.
Figure 10:
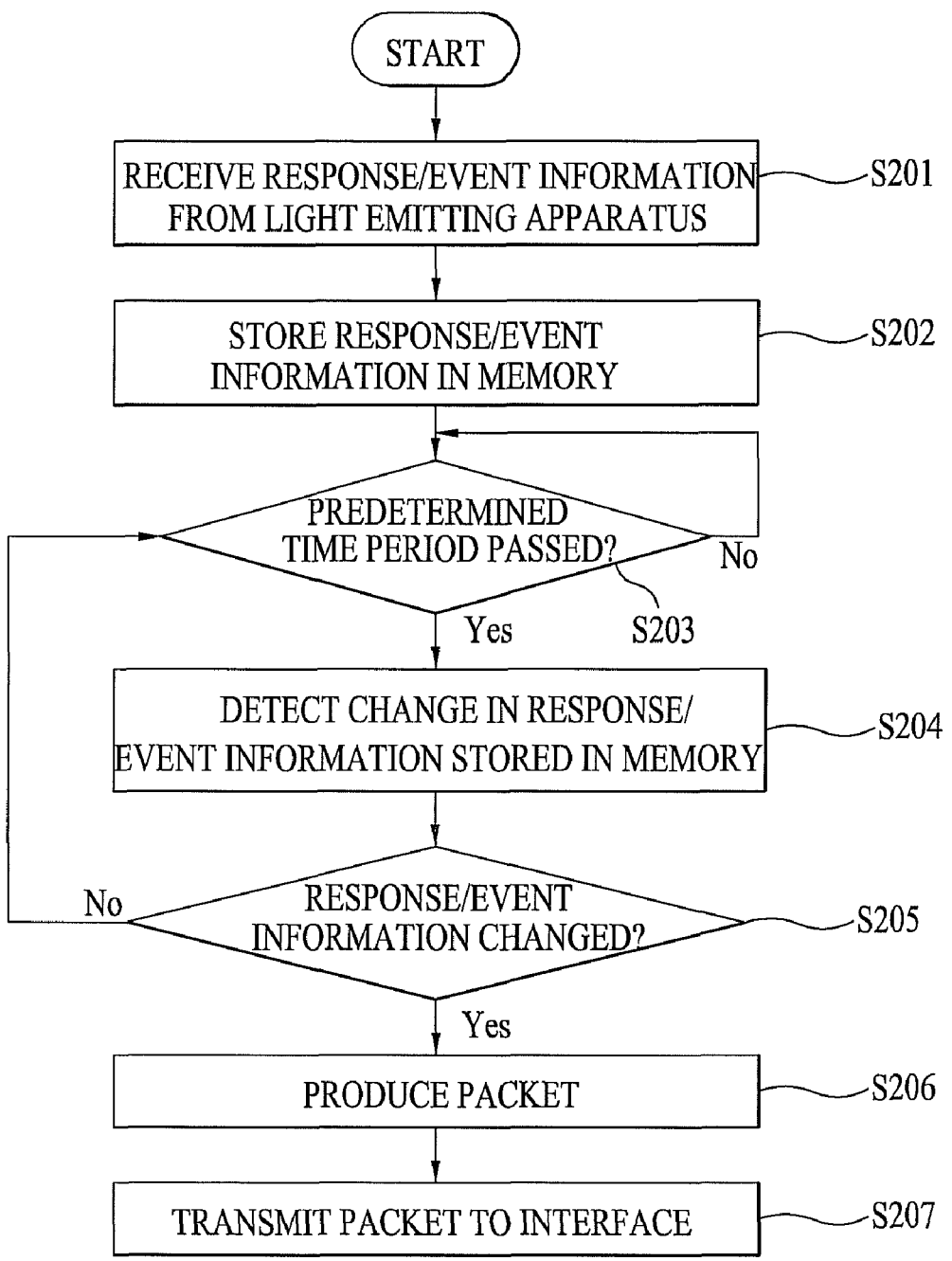
FIG. 10 is a flow chart illustrating the operation of the lighting system of FIG. 9.

FIG. 9 is a block diagram illustrating an operation of the lighting system according to one embodiment of the present disclosure. FIG. 10 is a flow chart of a method illustrating the operation of the lighting system of FIG. 9. The lighting system of this embodiment may include the plurality of light emitting units 41 to 43 and 51 to 53, the plurality of bridge devices 40 and 50 to receive a response or event/state information from the plurality of light emitting apparatuses, and the gateway 30 connected to the respective bridge devices 40 and 50 so as to communicate therewith.

The lighting system may include the controller 20 having the communication module 23 to receive the response or event/state information from the light emitting for transmission to the gateway 30, a memory 27 (a shared response memory) to store the response or event/state information, and the connection management module 22 configured to generate a single packet that includes information from a plurality of light emitting apparatuses. For example, the response or event/state information from the light emitting apparatus 41 connected to bridge 40 and the light emitting apparatus 51 connected to the other bridge 50 may be stored in the memory 27 and used to form a single packet. The interface 10 may be connected to the connection management module 22 so as to communicate therewith and may display the response or event/state information of the light emitting apparatuses, for example, on a GUI.

Here, the connection management module 22 may monitor the response or event/state information stored in the memory 27 at predetermined time intervals (for example, every ~10 ms). Also, the connection management module 22 may combine the plurality of response or event/state information into a single packet if it is determined that the response or event/state information stored in the memory 27 has changed. In certain embodiments, the connection management module 22 may generate the single packet to include those only response or event/state information among the plurality of response or event/state information for the light emitting units stored in the memory 27 which are of a similar or same type. For example, all stored state information reporting an "off" state which are received within the prescribed time period may be combined into one packet. The packet may also be formatted based on, for example, a group of lights or a particular bridge associated with the lights.

The predetermined time interval may be set by the user and stored in the preferences or may be set automatically based on load. For example, when a large amount of data packets are loading the system, the time interval between packet generations may be increased to combine a greater amount of packets into a single packet. Conversely, a shorter time interval may reduce a delay in processing the packets to improve response times during times of low traffic. Moreover, the predetermined time interval may be a scheduled time, rather than a periodic time period.

FIG. 10 illustrates a method of processing and transferring a response or event/state information through the gateway 30, and transmitted to the interface 10. In this embodiment, a response/event information from one or more light emitting apparatuses may be received, in step S201. The information may be received at the communication module 23 from the gateway 30 and bridge 40. The response/event information may be stored in the memory 27, in step S202. The controller 20 may determine whether a predetermined amount of time has elapsed, in step S203. If the time period has elapsed since the last time the information was checked, the communication module 23 may determine whether or not the response/event information stored in the memory 27 has changed, in step S204. If it is determined that the response/event information has changed, in step S205, the communication module 23 may generate the packet, in step S206. This packet may include one or more response/event information consolidated into a single packet. The produced packet may be transmitted to the interface 10, in step S207.

Steps S201 and S202 may be performed by the communication module 23 to receive and store the response/event information transmitted to the communication module 23 in the memory 27. Steps S203 to S207 may be performed in the communication module 23. It should be appreciated, however, that this disclosure is not limited thereto and, the steps may be performed in another appropriate device. For example, steps S203 to S207 may be performed in the connection management module 22.

Moreover, the controller 20 may generate a single packet that includes the plurality of response/event information from the light emitting apparatuses 41, 42 and/or 43 connected to a first bridge 40 and/or the light emitting apparatuses 51, 52 and/or 53 connected to a second bridge 50, which may reduce network traffic by reducing the number or packets transmitted.

In addition, the packet may include the address information of the bridge devices, address information of the light emitting apparatuses connected to the corresponding bridge devices, and the response/event values for the corresponding light emitting apparatuses. The connection management module 22 may monitor the response/event values stored in the memory 27 at predetermined time intervals, and may combine the plurality of response/event values into a single packet if the response/event values stored in the memory 27 have changed. For example, the connection management module 22 may generate the new packet that includes the plurality of control command values only when the response/event values stored in the memory 27 have changed, rather than transmitting a separate packet for each of the control commands stored in the memory 27 in real time.

In particular, the connection management module 22 may generate the packet to include the response/event values which have the same response/event value among the plurality of response/event values for the light emitting units stored in the memory 27. Alternatively, the packet may be formatted to group information based on a specific event or a similar category of events (e.g., address assignment), or the packet may be formatted to be grouped based on the device sending the information (e.g., a bridge, a prescribed group or lights).

A process of producing the one or more combined packets based on response/event values is the same or similar to the above description with reference to FIGS. 6 and 7, and thus, a description thereof is omitted hereinafter.

In addition, the memory 27 may include storage sections in which sequence numbers required to confirm a change in the response/event values are stored. The storage sections may be a table, or the like. The communication module 23 may store the response/event values and the sequence numbers together in the memory 27. The connection management module 22 may compare previous values and current values of the sequence numbers with each other and may determine that the response/event information stored in the memory 27 has changed if the previous values differ from the current values.

Figure 11:
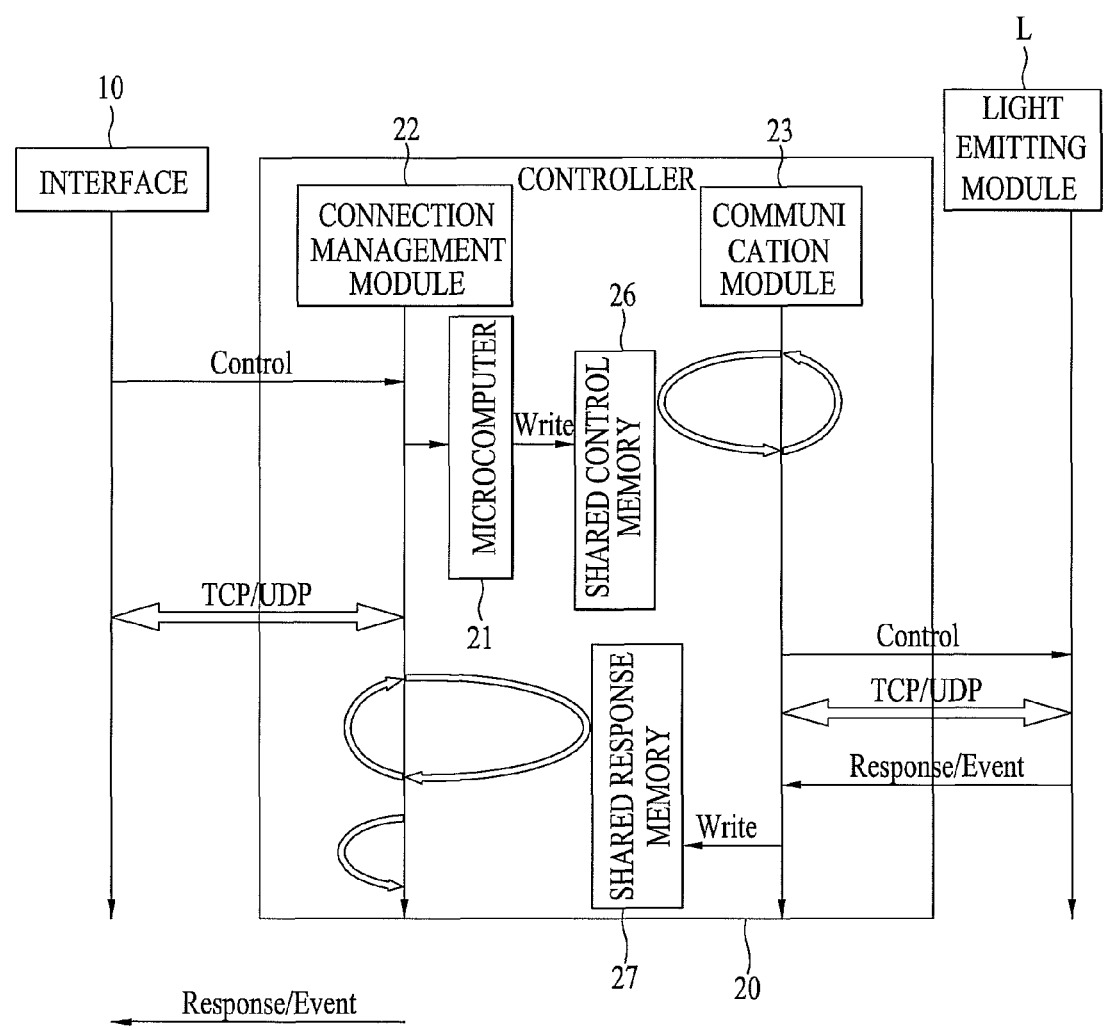
FIG. 11 is a block diagram to illustrate an operation of the lighting system according to one embodiment of the present disclosure.

FIG. 11 is a block diagram illustrating an operation of the lighting system according to an embodiment of the present disclosure. In this embodiment, the lighting system may include an interface 10, a controller 20, and a plurality of light emitting module L. The light emitting module L may include one or more light emitting apparatus and one or more corresponding bridge. The controller 20 may include the microcomputer 21, the connection management module 22, the communication module 23, the shared control memory 26, and the shared response memory 27.

In this embodiment, if control commands are input via the interface 10, the control commands may be converted into internal language of the controller 20 via the connection management module 22 of the controller 20, the converted control commands may be transmitted to the microcomputer 21. The microcomputer 21 may write the control commands in the shared control memory 26 in real time.

The communication module 23 may scan the shared control memory 26 at predetermined time intervals (~10 ms) and may combine the plurality of control commands into a single packet when the input control commands a found to have changed. Thereafter, the communication module 23 may transmit the packet to the corresponding light emitting unit L through the gateway.

In particular, as described above, instead of transmitting the control commands written in the shared control memory 26 to the corresponding light emitting units L in real time, the lighting system may determine whether or not the control commands stored in the shared control memory 26 have changed at predetermined time intervals. If a change is detected, a packet may be generated that includes the plurality of control commands for the plurality of light emitting units L. The packet may include those control commands having the control command value a single packet. Moreover, the packet may be created only when the control commands have changed. This may reduce the load on the processors by reducing the number of packets that must be formed as well as reduce load on the network by reducing the overall number of packets.

Moreover, if a response/event information from the light emitting units L is received via the gateway 30, the response/event information may be converted into an internal language of the controller 20 by the communication module 23 of the controller 20, and the communication module 23 may write the response/event information in the shared response memory 27 in real time.

The connection management module 22 may scan the shared response memory 27 at predetermined time intervals (e.g., every ~10 ms) and may combine the plurality of response/event information into a single packet, for example, only when the input response/event information has changed. Thereafter, the connection management module 22 may transmit the packet to the interface 10 for display and processing thereon.

For example, rather than transmitting in real time the response/event information stored in the shared response memory 27 to the interface 10, the lighting system may determine whether or not the response/event information written in the shared response memory 27 has been changed at predetermined time intervals. The lighting system may generate the packet including the plurality of response/event information for the plurality of light emitting units having the same response/event information when the response/event information has changes. This may reduce the amount of time and resources required to generate as well as transfer the packets, resulting in reduced network traffic.

As broadly disclosed and embodied herein, a lighting system may reduce a quantity of data introduced into a network and improve communication reliability. Moreover, the lighting system may generate a plurality of control commands, responses or events associated with a plurality of lights into a single packet. The lighting system may produce the packet if the control command or response/event information changes or updates.

In one embodiment, a lighting system may include a first bridge to wirelessly receive and transmit packets, a first plurality of lights coupled together in a prescribed configuration for communication with the first bridge, a second bridge to wirelessly receive and transmit packets, a second plurality of lights coupled together in a second prescribed configuration for communication with the second bridge, a gateway to wirelessly receive and transmit packets between the first bridge and to wirelessly receive and transmit packets between the second bridge, a memory to store a plurality of commands to control a corresponding light, and a communication module configured to generate a packet for transmission to the gateway based on the plurality of stored commands, wherein the packet includes at least a first command and a second command to control one or more of the lights.

The lighting system may further include a display for inputting the plurality of commands to control the first and second plurality of lights and for displaying a status of the first and second plurality of lights. The communication module may detect changes in the stored commands at predetermined time intervals, and generates the packet if at least one command has changed. The first and second commands in the packet may be different types of commands that control the same light. Moreover, the first and second commands in the packet may be the same type of command that control different lights.

The first command in the packet may control at least one light in communication with the first bridge and the second command in the packet controls at least one light in communication with the second bridge. The first command and the second command in the packet may be different types of commands. The packet may include an address for at least one bridge, an address for at least one light connected to the corresponding bridge, and the first and second commands.

The communication module may detect changes in the stored commands at predetermined time intervals. The communication module may generate the packet that includes the first and second commands if at least one command has been changed. Moreover, the first and second commands in the packet may be the same command that control different lights.

A connection management module may be provided, wherein the memory stores a plurality of information corresponding to at least one of the plurality of lights and the connection management module generates a second packet for displaying the information on the display, the second packet including two or more of the information stored in the memory. Moreover, the first and second bridges, the gateway, and the controller may communicate with one another via Zigbee. The first and second bridges and the first and second plurality of lights may communicate with each other via RS-485.

In one embodiment, a lighting system may include a first bridge to wirelessly receive and transmit packets, a first plurality of lights connected together in a prescribed configuration for communication with the first bridge, a second bridge to wirelessly receive and transmit packets, a second plurality of lights connected together in a second prescribed configuration for communication with the second bridge, a gateway to wirelessly receive and transmit packets between the first bridge and to wirelessly receive and transmit packets between the second bridge, a display for displaying information related to the first and second plurality of lights; and a controller connected to the bridge and the display to control the first and second plurality of lights. The controller may includes a memory to store a first packet received from one of the first plurality of lights and a second packet received from one of the second plurality of lights, the first and second packets including information related to corresponding lights, and a connection management module configured to generate a third packet for transmission to the display for displaying the information. The third packet includes information from the first and second packets.

The connection management module may detect changes in the stored information at predetermined time intervals. The connection management module may generate the third packet if at least one information for lights has changed. The connection management module may generate the third packet to group a plurality of information of the same type or to group a plurality of information for a particular light. Moreover, the first and second bridges, the gateway, and the communication module may communicate with one another via Zigbee, and at least one of the first and second bridges and the corresponding plurality of lights may communicate with each other via RS-485.

In one embodiment, a lighting system may include a first bridge to wirelessly receive and transmit packets, a first plurality of lights coupled together in a prescribed configuration for communication with the first bridge, a second bridge to wirelessly receive and transmit packets, a second plurality of lights coupled together in a second prescribed configuration for communication with the second bridge, a gateway to wirelessly receive and transmit packets between the first bridge and to wirelessly receive and transmit packets between the second bridge, a memory to store a plurality of commands, a communication module configured to generate a packet for transmission to the gateway based on the plurality of stored commands, wherein the packet includes a first command to control at least one light in communication with the first bridge and a second command to control at least one light in communication with the second bridge; and a controller to control the memory and the communication module.

In one embodiment, a lighting system may include a plurality of light emitting units, a plurality of bridge devices to communicate with the plurality of light emitting units, a gateway connected to the respective bridge devices so as to communicate therewith, an interface to input control commands for the light emitting elements or display status information of the light emitting units, and a controller including a memory to store a plurality of control commands transmitted from the interface, and a communication module to generate the control commands for the light emitting units connected to any one bridge device and the light emitting elements connected to the other bridge device into a single packet so as to transmit the packet to the gateway.

The communication module may confirm the control commands stored in the memory at a predetermined time interval. The communication module may generate a plurality of control commands for the plurality of light emitting units into a single packet to transmit the packet to the gateway if the control commands stored in the memory change. The communication module may generate a plurality of control commands for any one light emitting unit into a single packet to transmit the packet to the gateway if the control commands stored in the memory change. The communication module may generate only the same control commands among the plurality of control commands for the light emitting units stored in the memory into a single packet to transmit the packet to the gateway. Moreover, the packet may include address information of the bridge devices, address information of the light emitting units connected to the corresponding bridge devices, and control command values of the corresponding light emitting units.

In one embodiment, a lighting system may include a plurality of light emitting units, a plurality of bridge devices to receive response or event/state information of the plurality of light emitting units, a gateway connected to the respective bridge devices so as to communicate therewith, a controller including a communication module to receive the response or event/state information of the plurality of light emitting units transmitted from the gateway, a memory to store the response or event/state information, and a connection management module to generate the response or event/state information for the light emitting units connected to any one bridge device and the light emitting elements connected to the other bridge device stored in the memory into a single packet, and an interface connected to the connection management module so as to communicate therewith, the interface serving to output the response or event/state information of the light emitting units.

The packet may include address information of the bridge devices, address information of the light emitting units connected to the corresponding bridge devices, and response or event values of the corresponding light emitting units. The connection management module may confirm the response or event values stored in the memory at a predetermined time interval. The connection management module may generate a plurality of response or event/state information into a single packet if the response or event values change. The connection management module may generate response or event/state information for the light emitting units, having the same response or event value among the plurality of response or event/state information stored in the memory, into a single packet to transmit the packet to the interface.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting system comprising:
   first and second bridge devices;
   first and second light emitting units connected to the first and second bridge devices in series to be able to communicate therewith, respectively;
   a gateway having the first and second bridge devices connected thereto in parallel to be able to communicate therewith;
   an interface for applying a control order to the light emitting units or displaying state information on the light emitting units; and
   a controller including
   a memory for storing a plurality of the control orders from the interface thereto, and
   a communication module for producing the control orders for the first light emitting unit connected to the first bridge device and the second light emitting unit connected to the second bridge device into one packet and transmitting the packet to the gateway,
   wherein the communication module produces only identical control orders from the plurality of control orders into one packet and transmitting the packet to the gateway, if the control orders stored in the memory are changed.

2. The lighting system as claimed in claim 1, wherein the communication module identifies the control orders stored in the memory at predetermined time intervals.

3. The lighting system as claimed in claim 1, wherein the packet includes
   bridge device address information,
   address information on the light emitting unit connected to the bridge device, and
   a control order value of the light emitting unit.

4. The lighting system as claimed in claim 3, wherein the communication module identifies the control order value stored in the memory at predetermined time intervals.

5. The lighting system as claimed in claim 4, wherein, if the control order value stored in the memory is changed, the communication module produces a plurality of control order values into one packet and transmits the packet to the gateway.

6. The lighting system as claimed in claim 5, wherein the communication module produces the control orders on the light emitting units having the same control order value from the plurality of control order values on the light emitting units stored in the memory into a packet and transmits the packet to the gateway.

7. The lighting system as claimed in claim 1, wherein the controller includes
a connection management module connected to the interface to be able to communicate therewith for converting the control order from the interface to a language of an inside of the controller, and
a microcomputer for applying the control order converted thus to the memory.

8. The lighting system as claimed in claim 1, wherein the bridge devices, the gateway and the communication module perform communication by Zigbee.

9. The lighting system as claimed in claim 1, wherein the bridge devices and the light emitting units perform communication by RS-485, respectively.

10. A lighting system comprising:
first and second bridge devices;
first and second light emitting units connected to the first and second bridge devices in series to be able to communicate therewith, respectively;
a gateway having the first and second bridge devices connected thereto in parallel to be able to communicate therewith for receiving a response from or event information on the first and second light emitting units through the bride devices, respectively; and
a controller including
a communication module for receiving a response from or event information on the plurality of light emitting unit through the gateway,
a memory for storing the response or the event information therein,
a connection management module for producing the response from or the event information on the first light emitting unit connected to the first bridge device and the second light emitting unit connected to the second bridge device stored in the memory unit into one packet, and
an interface connected to the connection management module to be able to communicate therewith for outputting the response from or event information on the light emitting unit,
wherein, if there is a change of a response or event value, the connection management module produces a plurality of the responses from or the event information on the plurality or one of the light emitting units having the same value stored in the memory into one packet and transmits the packet to the interface.

11. The lighting system as claimed in claim 10, wherein the packet includes;
bridge device address information,
address information on the light emitting unit connected to the bridge device, and
the response or event value of the light emitting unit.

12. The lighting system as claimed in claim 11, wherein the connection management module identifies the response or event value stored in the memory unit at predetermined time intervals.

13. The lighting system as claimed in claim 10, wherein the communication module converts the response or an event order from the gateway into an inside language of the controller.

14. The lighting system as claimed in claim 10, wherein the plurality of the light emitting units and one of the bridge devices perform communication by RS-485.

15. The lighting system as claimed in claim 14, wherein the gateway, the communication module, and the bridge devices perform communication by Zigbee.

* * * * *